United States Patent [19]
Byrne et al.

[11] Patent Number: 5,330,650
[45] Date of Patent: Jul. 19, 1994

[54] DISPERSION POLYMERS FOR OIL FIELD WATER CLARIFICATION

[75] Inventors: Norman E. Byrne, Houston; Robert A. Marble, Sugarland, both of Tex.; Manian Ramesh, Naperville, Ill.

[73] Assignee: Nalco Chemical Company, Naperville, Ill.

[21] Appl. No.: 968,763

[22] Filed: Oct. 30, 1992

[51] Int. Cl.$^5$ .............................................. C02F 1/56
[52] U.S. Cl. ............................... 210/708; 210/728; 210/734; 252/341; 252/358
[58] Field of Search ............... 210/708, 712, 725, 727, 210/728, 734; 252/341, 358

[56] References Cited

U.S. PATENT DOCUMENTS

| | | | |
|---|---|---|---|
| 4,059,515 | 11/1977 | Fowler et al. | 252/358 |
| 4,120,815 | 10/1978 | Raman | 252/341 |
| 4,588,508 | 5/1986 | Allenson et al. | 210/708 |
| 4,715,962 | 12/1987 | Bhattacharyya et al. | 210/708 |
| 4,929,655 | 5/1990 | Takeda et al. | 524/458 |
| 4,931,191 | 6/1990 | Braden et al. | 210/725 |
| 5,006,590 | 4/1991 | Takeda et al. | 524/458 |
| 5,032,285 | 7/1991 | Braden et al. | 210/708 |

*Primary Examiner*—Peter A. Hruskoci
*Attorney, Agent, or Firm*—Robert A. Miller; Joseph B. Barrett; James J. Drake

[57] ABSTRACT

One aspect of the invention provides a method of removing emulsified oil from oil field produced water. According to the method, the oil-containing water is treated with an effective amount of a dispersion of a water-soluble cationic polymer.

7 Claims, 2 Drawing Sheets

DISPERSION POLYMERS FOR OIL FIELD WATER CLARIFICATION

BACKGROUND OF THE INVENTION

1. Field of the Invention

The invention is directed to compositions and methods for removing residual oil from oil field produced water; and more particularly, the invention is directed to a method of removing residual oil from oil field produced waters using water-soluble polymers dispersed in a concentrated salt media.

2. Description of the Prior Art

As oil field reservoirs age and become depleted, one method to increase oil production is to maintain the pressure in the formation by injecting water or steam into the formation. The water or steam forces the oil out of the formation and to the surface. This method for sustaining oil production is referred to as secondary oil recovery. Secondary recovering is one of the most widely used recovery methods.

In secondary oil recovery, the produced fluids include the injected water emulsified with the oil. In order for the oil to be sold, it must first be separated from the water. The oil separation process is, however, not totally efficient. Some amount (200–10,000 ppm) of oil remains emulsified in the produced water. It is this waste water which is of concern. The produced water must be treated in some manner to remove the residual oil before discharge.

The emulsified oil in the produced water is typically present in the range of several hundred to tens of thousands of ppm. It is critical to remove this residual oil not only from an economic standpoint of selling the oil, but also from an environmental standpoint. The United States Environmental Protection Agency has placed tight restrictions on total oil and grease (TOG) limits for water that is to be discharged into public drinking water supplies or into open bodies of water. In addition to the governmental regulations, the residual oil must be removed in order to maintain a clean source of water or steam for reinjection into the underground formation. Failure to do so would result in eventual plugging of the formation and decreased production.

One of the most effective methods of removing the emulsified oil is through the use of the chemical aids. Historically, dry polymers, solution polymers, inverse emulsion latexes and metal ions have been used to treat the produced water. Each material has its own advantages and disadvantages.

While dry polymers have the benefit of being extremely concentrated, thereby reducing shipping costs, the equipment to dissolve the polymers is expensive and is not available in the oil field.

Latex polymers also suffer from problems but are used quite frequently. Latex polymer preparations include 30–35% solids dispersed in oil. The latex polymer must be also inverted prior to use. Like the dry polymer, the equipment in the oil field for prior inversion is not available, thus forcing the direct feeding of the polymer into the system. Numerous problems associated with this feeding method have caused many customers to avoid latex polymers. In addition, the latexes generally have a very narrow treating range, often resulting in over-treatment at higher dosages.

Although solution polymers require no prior make up, the percent solids and molecular weight are severely limited due to the nature of the material. These materials are often used to break reverse emulsions, but they are unable to flocculate the dispersed oil, thus requiring another chemical to accomplish this.

Metal ions, such as, $Fe^{3+}$, $Zn^{2+}$, $Al^{3+}$, etc., have long been used to break reverse emulsions, but recent government regulations have restricted their levels in discharged streams. Although effective at breaking reverse emulsions, they, too, require another chemical to flocculate the oil.

The water-soluble dispersion polymers of the invention offer many solutions to these problems and represent a new method to treat oil field produced waste waters.

SUMMARY OF THE INVENTION

One aspect of the invention provides a method of removing emulsified oil from oil field produced water. According to the method, the oil-containing water is treated with an effective amount of a dispersion of a water-soluble cationic polymer. The dispersion of the water-soluble cationic polymer is prepared by polymerizing a water-soluble monomer mixture containing at least 5 mole % of a cationic monomer represented by general formula (I) and at least 5 mole % of acrylamide or methacrylamide in an aqueous solution of a polyvalent anionic salt. The polymerization is carried out in the presence of a dispersant polymer. The dispersant polymer is a water-soluble cationic polymer which is soluble in the aqueous solution of the polyvalent anionic salt. Also, the dispersant polymer contains at least 20 mole % of cationic monomer units represented by general formula (II):

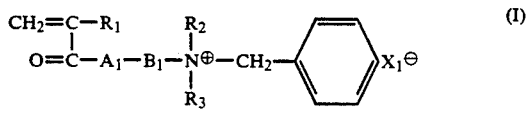

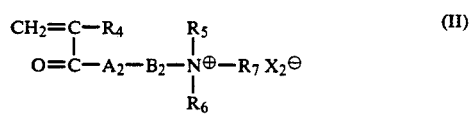

wherein $R_1$ and $R_4$ are each H or $CH_3$; $R_2$, $R_3$, $R_5$ and $R_6$ are each an alkyl group having 1 to 2 carbon atoms; $R_7$ is a hydrogen atom or an alkyl group having 1 to 2 carbon atoms; $A_1$ and $A_2$ are each an oxygen atom or NH; $B_1$ and $B_2$ are each 2 to 4 carbon atoms or a hydroxypropyl group and $X_1$- and $X_2$-are each a counter anion.

A further aspect of the invention provides that the polymerization is further carried out in the presence of a seed polymer. The seed polymer is a water-soluble cationic polymer which is insoluble in the aqueous solution of the polyvalent anionic salt. The seed polymer also contains at least 5 mole % of cationic monomer units represented by the general formula (I).

According to one preferred embodiment, the water-soluble monomer mixture further contains at least 5 mole % of a cationic monomer represented by the general formula (II). The multivalent anionic salt preferably comprises a phosphate, a sulfate or a mixture thereof.

DESCRIPTION OF THE PREFERRED EMBODIMENTS

Figure 1:
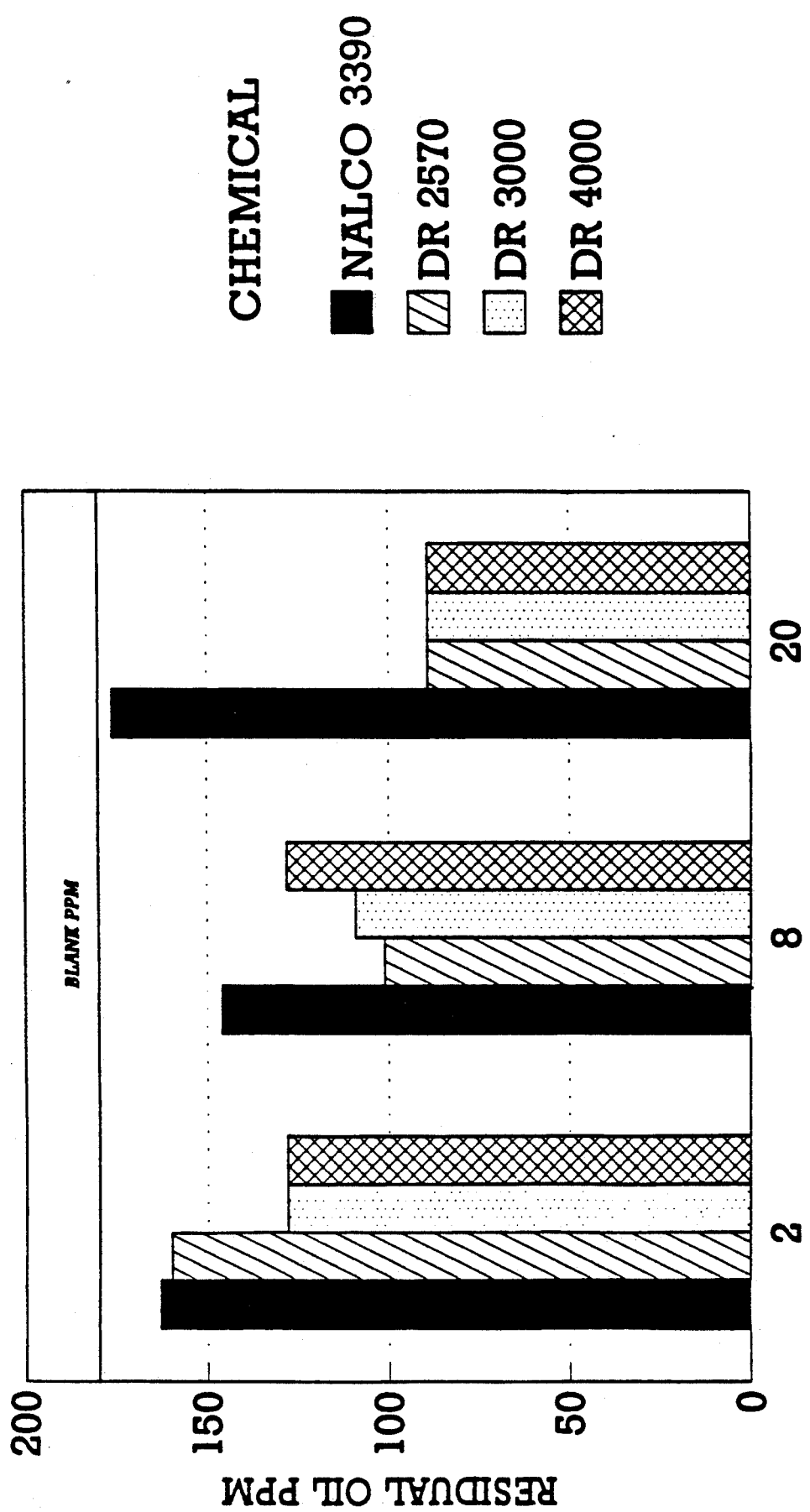
FIG. 1 is a graph summarizing the data from an evaluation of latex polymers and the water-soluble polymer dispersion used in the invention.

The invention provides a superior method for removing emulsified oil from oil field produced water. A new class of water-soluble dispersion polymers have been discovered to be more effective in removing emulsified oil from produced waters than currently available chemical treatments. As will be discussed in more detail below, the polymer dispersion of the invention is prepared in an aqueous solution of a polyvalent anionic salt. The polymer dispersion of achieves fine particle sizes and aqueous solubilities not available with other polymers used for this application. The polymer dispersion used in the present invention is shown in the Examples to remove twice as much emulsified oil from produced waste water as currently available chemical treatments. Furthermore, there does not appear to be a problem with overfeeding the polymer dispersion which is a drawback with latex polymers.

According to the method, the polymers of the invention are added to water produced from an oil field. The polymers are added in an effective amount of from 0.5 to about 100 ppm. More preferably, the amount of the polymer in the produced water is from 2 to about 40 ppm; and most preferably from about 4 to about 20 ppm. It should be noted, however, that there does not appear to be a maximum dosage at which the polymers adversely affect the system. It does appear that at some higher doses the beneficial affect plateaus, and on a cost basis such higher doses, probably above about 100 ppm, are not cost effective. The polymers of the invention are preferably added to the system in neat form. However, in some applications, the polymers can be added as an aqueous solution.

Once the polymers of the invention are added to the produced water, the treated produced water is naturally agitated as it moves through the clarification system. The polymers of the invention will cause the emulsified oil to separate from the water and float to the surface of the water as a flock. The flock is subsequently removed from the surface of the water and added to the oil production. The treated water can now be discharged either into a river, lake or ocean or reinjected into the formation to force oil to the surface. The preferred polymers of the invention are manufactured by Hymo Corporation, Japan. Preferred polymer preparations are available from Hymo Corporation under the trade name designations DR-2570, DR-3000 and DR-4000. Methods for manufacturing the polymer dispersion used in the invention is described in detail in U.S. Pat. Nos. 5,006,590 and 4,929,655, assigned to Kyoritsu Yuki Co., Ltd., Tokyo, Japan. The disclosures of these two patents are incorporated herein.

According to the invention, the polymer dispersion used to treat the produced water is prepared from a water-soluble monomer mixture containing at least 5 mole % of a cationic monomer represented by the general formula (I):

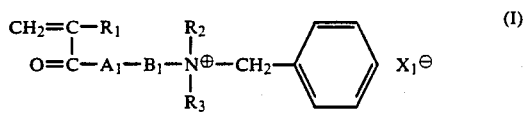

wherein $R_1$ is H or $CH_3$; $R_2$ and $R_3$ are each an alkyl group having 1 to 2 carbon atoms; $A_1$ is an oxygen atom or NH; $B_1$ is an alkyl group having 2 to 4 carbon atoms or a hydroxypropyl group and $X_1$ is a counter anion. The above watersoluble monomer mixture is soluble in the aqueous solution of the polyvalent anionic salt. The polymer generated from the monomer mixture is, however, insoluble in the aqueous polyvalent anionic salt solution. The polymer of the monomer mixture can also be used as the seed polymer. The seed polymer is described in detail below.

The above cationic monomer represented by the general formula (I) preferably is a quaternary ammonium salt obtained by the reaction of benzyl chloride and dimethylaminoethyl acrylate, diethylaminoethyl acrylate, dimethylaminohydroxypropyl acrylate, dimethylaminopropyl acrylamide, dimethylaminoethyl methacrylate, dimethylaminoethyl methacrylate, diethylaminoethyl methacrylate and dimethylaminopropyl methacrylamide.

Monomers preferably copolymerized with the cationic monomer represented by the general formula (I) includes acrylamide, methacrylamide and the cationic monomers represented by the general formula (II):

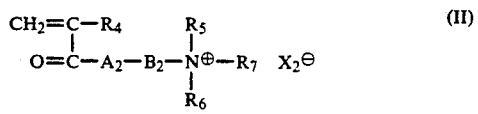

wherein $R_4$ is H or $CH_3$; $R_5$ and $R_6$ are each an alkyl group having 1 to 2 carbon atoms; $R_7$ is H or an alkyl group having 1 to 2 carbon atoms; $A_2$ is an oxygen atom or NH; $B_2$ is an alkyl group having 2 to 4 carbon atoms or a hydroxypropyl group and $X_2$ is a counter anion.

Preferable monomers represented by the formula (II) include the ammonium salts of dimethylaminoethyl acrylate, diethylaminoethyl acrylate, dimethylaminopropyl acrylamide, diethylaminopropyl acrylamide and dimethylhydroxypropyl acrylate, dimethylaminoethyl methacrylate, diethylaminoethyl methacrylate, dimethylaminopropyl methacrylamide, diethylaminopropyl methacrylamide and dimethylhydroxypropyl methacrylate as well as the methylated and ethylated quaternary salts. Among the more preferable cationic monomers represented by the general formula (II) are the salts and methylated quaternary salts of dialkylaminoethyl acrylate and dialkylaminoethyl methacrylate. The concentration of the above-mentioned monomers in the polymerization reaction mixture is suitably in the range of 5 to 30% by weight.

The polyvalent anionic salt to be incorporated in the aqueous solution according to the present invention is suitably a sulfate, a phosphate or a mixture thereof. Preferable salts include ammonium sulfate, sodium sulfate, magnesium sulfate, aluminum sulfate, ammonium hydrogenphosphate, sodium hydrogenphosphate and potassium hydrogenphosphate. In the present invention, these salts may be each used as an aqueous solution thereof having a concentration of 15% or above.

A dispersant polymer is present in the aqueous anionic salt solution in which the polymerization of the above monomers occurs. The dispersant polymer is a water-soluble high molecular weight cationic polymer. The dispersant polymer is soluble in the above-mentioned aqueous salt solution. The dispersant polymer is preferably used in an amount of from 1 to 10% by weight based on the total weight of the monomers. The dispersant polymer is composed of 20 mole % or more of cationic monomer units represented by the formula (II). Preferably the residual mole % is acrylamide or methacrylamide. The performance of the dispersant is not greatly affected by molecular weight. However, the molecular weight of the dispersant is preferably in the range of 10,000 to 10,000,000. According to one embodiment of the invention a multifunctional alcohol such as glycerin or polyethylene glycol is coexistent in the polymerization system. The deposition of the fine particles is smoothly carried out in the presence of these alcohols.

For the polymerizations a usual water-soluble radical-forming agent can be employed, but preferably water-soluble azo compounds such as 2,2'-azobis(2-amidinopropane) hydrochloride and 2,2'-azobis(N,N'-dimethyleneisobutylamine) hydrochloride are used.

According to one embodiment of the invention, a seed polymer is added before the beginning of the polymerization of the above monomers for the purpose of obtaining a fine dispersion. The seed polymer is a water-soluble cationic polymer insoluble in the aqueous solution of the polyvalent anionic salt. The seed polymer is preferably a polymer prepared from the above monomer mixture by the process described herein. Nevertheless, the monomer composition of the seed polymer need not always be equal to that of the water-soluble cationic polymer formed during polymerization. However, like the water-soluble polymer formed during polymerization, the seed polymer should contain at least 5 mole percent of cationic monomer units represented by the general formula (I). According to one embodiment of the invention, the seed polymer used in one polymerization reaction is the water-soluble polymer prepared in a previous reaction which used the same monomer mixture.

The following Examples are presented to describe preferred embodiments and utilities of the invention and are not meant to limit the invention unless otherwise stated in the claims appended hereto.

EXAMPLE 1

The treating abilities of the polymers of the invention and latex polymer preparations where evaluated by alternately hand shaking and visually comparing water clarity through several sets of agitation. Two (2) to about five (5) gallons of oil field produced water was collected. Six (6) ounce clear glass bottles were filled with 100 ml of water and inverted several times to coat the bottles with emulsified oils. The treating chemicals were added to individual bottles as 1% aqueous solutions. The treating chemicals compared were NALCO ® 3374 and NALCO ® 3390, obtained from Nalco Chemical Company, Naperville, Illinois and DR-3000, DR-2570 and DR-4000, obtained from the Hymo Corporation, Japan. NALCO 3374 and NALCO 3390 are latex polymer preparations which are commonly used in the oil filed for this application. DR-3000, DR-2570 and DR-4000 are commercial preparations of the dispersion of the water-soluble cationic polymer used in the invention. the bottles were capped, numbered and agitated. All samples were agitated identically. The agitation was intended to match water clarification system conditions. The agitation was done in sets with observation and evaluation done after each set. Observations such as water clarity, unbroken emulsion, dispersed oil droplets and relative qualities of oil left in the water were reduced to quick numerical grades of 1-10, with 10 being the best. The final concentration of treated chemicals in the waste water was 20 ppm. After several sets of agitation, done in quick succession, to avoid cooling and aging of the emulsion, water clarity, the size and persistency of the flock, and relative clarity of the water were recorded.

Table I below summarizes the data collected. As shown in Table I, the dispersion of the cationic water-soluble polymers used in the invention were far superior to the latex polymer preparations currently being sold for this application.

TBLE I

| Treating Chemical | Dose PPM | Water Clarity |
|---|---|---|
| NALCO 3390 | 20 | 3 |
| NALCO 3374 | 20 | 3 |
| DR-2570 | 20 | 8 |
| DR-3000 | 20 | 9 |
| DR-4000 | 20 | 9 |
| Blank | 20 | 4 |

EXAMPLE 2

Two (2) liters of oil field produced water were placed into a mixing bowl. A Wemco ® mixing unit was put in place. The Wemco mixer mixes and disperses air into the produced water. Each sample of produced water was dosed with a treating chemical as a 1% aqueous solution. The samples were dosed at 2,8 and 20 ppm. The chemical treating agents used were NALCO 3390, DR-3000, DR-2570 and DR-4000. Each sample was whipped for 1 minute at 1800 RPM. After whipping the sample, the samples were allowed to rest until the dissolved air bubbled-off. On top of each sample was flocculated oil. 40 ml of treated water was taken from beneath the surface of each. The 40 ml of treated water was extracted with 20 ml of Freon ®-113 obtained from Fisher Scientific Corporation. The extract obtained was filtered through Whatman ® Filter Paper No. 541. The filtered extract was placed in a quartz cuvette and placed in Miran ® fixed wavelength infrared spectrophotometer (wavelength 2874 cm$^{-1}$). The absorbance of the filtered extract was obtained. The absorbance was compared to a dosage curve to determine the amount of residual emulsified oil remaining in the water sample. The dosage curve was prepared prior to the experiment by taking known amounts of oil in water and obtaining the infrared absorbance. The data obtained is summarized in FIG. 1. As FIG. 1 shows, at all dosage levels, the dispersion polymers used in the invention were superior to the latex preparations currently being used for this application. Furthermore, FIG. 1 shows that at 20 ppm, the latex polymer preparation overtreats the system. This phenomena actually causes a decrease in the clarity of the produced water.

EXAMPLE 3

Figure 2:
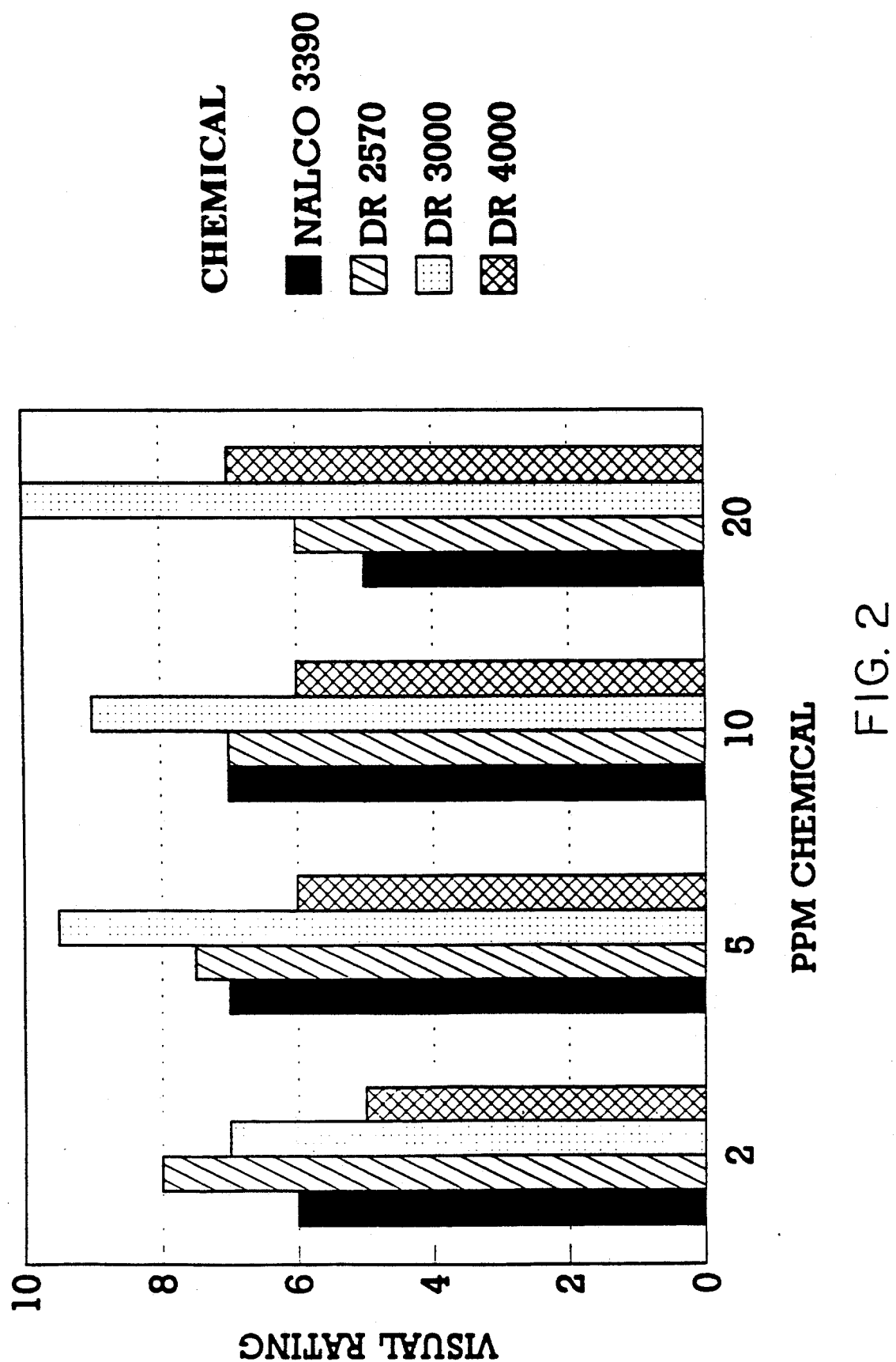
FIG. 2 is a bar-graph summarizing the data from an evaluation comparing latex polymer to the water-soluble polymer dispersion used in the invention.

The procedure for Example 3 was identical to Example 1 except that different dosages of the chemical treating agents were used. The data obtained in Example 3 is summarized in FIG. 2. As shown in FIG. 2, all of the polymers used in the invention substantially out-perform the latex polymer currently being used for this application.

Changes can be made in the composition, operation and arrangement of the method of the present invention described herein without departing from the concept and scope of the invention as defined in the following claims.

We claim:

1. A method of removing emulsified oil from a oil field produced water, the method comprising the step of treating the oil-containing water with an effective amount of a dispersion of a water-soluble cationic polymer, said dispersion of the water-soluble cationic polymer being prepared by polymerizing a water-soluble monomer mixture containing a least 5 mole % of a cationic or methacrylamide in an aqueous solution of a polyvalent anionic salt, said polymerization is carried out in an aqueous solution including from about 1 to about 10 percent by weight based on the total weight of the monomers a dispersant polymer, said dispersant polymer being a water-soluble cationic polymer which is soluble in said aqueous solution of the polyvalent anionic salt and which contains at least 20 mole % of cationic monomer units represented by a general formula (II):

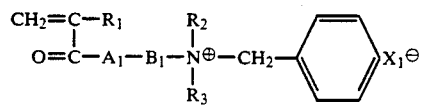 (I)

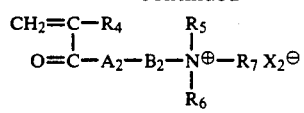 (II)

wherein $R_1$ and $R_4$ are each H or $CH_3$; $R_2$, $R_3$, $R_5$ and $R_6$ are each an alkyl group having 1 to 2 carbon atoms; $R_7$ is a hydrogen atom or an alkyl group having 1 to 2 carbon atoms; $A_1$ and $A_2$ are each an oxygen atom or NH; $B_1$ and $B_2$ are each 2 to 4 carbon atoms or a hydroxypropyl group and $X_1$- and $X_2$- are each a counter anion once treated, the emulsified oil flocculates; and removing the flocculated emulsified oil from the treated oil field produced water.

2. The method of claim 1 wherein said aqueous solution further include a seed polymer; said seed polymer being a water-soluble cationic polymer which is insoluble in said aqueous solution of the polyvalent anionic salt and which contains at least 5 mole % of cationic monomer units represented by the general formula (I).

3. The method of claim 1 wherein the water-soluble monomer mixture further contains at least 5 mole % of a cationic monomer represented by the general formula (II).

4. The method of claim 1 wherein the polyvalent anionic salt comprises a phosphate, a sulfate or a mixture thereof.

5. The method of claim 1 wherein the effective amount of the dispersion of the water-soluble cationic polymer added to the oil-containing water is at least 0.5 ppm.

6. The method of claim 1 wherein the effective amount of the dispersion of the water-soluble cationic polymer added to the oil-containing water is at least 2 ppm.

7. The method of claim 1 wherein the effective amount of the dispersion of the water-soluble cationic polymer added to the oil-containing water is at least 4 ppm.

* * * * *

UNITED STATES PATENT AND TRADEMARK OFFICE
CERTIFICATE OF CORRECTION

PATENT NO. : 5,330,650
DATED : July 19, 1994
INVENTOR(S) : Norman E. Byrne, et al It is certified that error appears in the above-indentified patent and that said Letters Patent is hereby corrected as shown below:

Column 7, Line 16, Claim 1

After "cationic" insert <u>monomer represented by general formula (I) and at least 5 mole % of acrylamide</u>

Signed and Sealed this

Twentieth Day of September, 1994

BRUCE LEHMAN

Attest:

Attesting Officer

Commissioner of Patents and Trademarks

UNITED STATES PATENT AND TRADEMARK OFFICE
CERTIFICATE OF CORRECTION

PATENT NO. : 5,330,650
DATED : July 19, 1994
INVENTOR(S) : NORMAN E. BYRNE, et al It is certified that error appears in the above-indentified patent and that said Letters Patent is hereby corrected as shown below:

Column 7, line 8, claim 1, after "cationic" insert --monomer represented by general formula (I) and at least 5 mole % of acrylamide--.

This certificate supersedes Certificate of Correction issued September 20, 1994.

Signed and Sealed this

Fourteenth Day of February, 1995

Attest:

BRUCE LEHMAN

Attesting Officer     Commissioner of Patents and Trademarks